(12) United States Patent
Ishihara et al.

(10) Patent No.: US 7,394,402 B2
(45) Date of Patent: Jul. 1, 2008

(54) TAILWIND ALERTING SYSTEM TO PREVENT RUNWAY OVERRUNS

(75) Inventors: Yasuo Ishihara, Kirkland, WA (US); Steve C. Johnson, Issaquah, WA (US)

(73) Assignee: Honeywell International Inc., Morristown, NJ (US)

( * ) Notice: Subject to any disclaimer, the term of this patent is extended or adjusted under 35 U.S.C. 154(b) by 268 days.

(21) Appl. No.: 11/161,368

(22) Filed: Aug. 1, 2005

(65) Prior Publication Data

US 2005/0270180 A1   Dec. 8, 2005

Related U.S. Application Data

(63) Continuation-in-part of application No. 09/775,455, filed on Feb. 2, 2001, now Pat. No. 7,068,187.

(60) Provisional application No. 60/665,031, filed on Mar. 23, 2005.

(51) Int. Cl.
*G08B 23/00* (2006.01)

(52) U.S. Cl. .................................... 340/968; 340/951

(58) Field of Classification Search ................ 340/968, 340/951, 949, 963, 970, 973, 945, 935
See application file for complete search history.

(56) References Cited

U.S. PATENT DOCUMENTS

| | | | |
|---|---|---|---|
| 4,021,010 A * | 5/1977 | Bliss | 244/182 |
| 5,153,588 A | 10/1992 | Muller | 340/968 |
| 6,177,888 B1 * | 1/2001 | Cabot et al. | 340/968 |
| 6,304,800 B1 * | 10/2001 | Ishihara et al. | 701/16 |
| 6,380,870 B1 * | 4/2002 | Conner et al. | 340/970 |
| 6,477,449 B1 * | 11/2002 | Conner et al. | 701/4 |
| 7,014,146 B2 * | 3/2006 | Villaume et al. | 244/111 |
| 2005/0182531 A1 * | 8/2005 | Ryan et al. | 701/16 |

FOREIGN PATENT DOCUMENTS

| | | | |
|---|---|---|---|
| EP | 0400691 A | 12/1990 |
| GB | 1586839 A | 3/1981 |
| WO | 0065123 A | 11/2000 |

* cited by examiner

*Primary Examiner*—Phung T. Nguyen

(57) ABSTRACT

Systems, methods and computer program products for alerting a flight crew during landing that the tailwind exceeds acceptable limits. The system determines a base tailwind threshold speed for a candidate runway based on a performance constant associated with an aircraft and candidate runway information and determines present tailwind speed. If the tailwind speed is greater than the base tailwind threshold speed, a tailwind alert is generated. Also, the system determines if the aircraft is in a tailwind alerting mode based on configuration of the aircraft and activates tailwind alerting, if it is determined that the aircraft is in the tailwind alerting mode.

15 Claims, 4 Drawing Sheets

TAILWIND ALERTING SYSTEM TO PREVENT RUNWAY OVERRUNS

CROSS-REFERENCE TO RELATED APPLICATIONS

This application claims the benefit of U.S. Provisional Application Ser. No. 60/665,031 filed Mar. 23, 2005, and is a Continuation-in-Part of U.S. patent application Ser. No. 09/775,455 filed Feb. 2, 2001 now U.S. Pat. No. 7,068,187 the contents of which are incorporated by reference.

BACKGROUND OF THE INVENTION

Landing an aircraft is the most demanding task in flying. During the landing process, the aircraft must transition from operating in three dimensions of motion to operating in only two dimensions and must be brought to a safe and complete stop. To perform the landing properly, the aircraft must approach the runway within certain attitude, track, speed and rate of descent limits. An approach outside of these limits can result in the aircraft making a "hard" landing, overrunning the runway end, or otherwise contacting the runway surface in an uncontrolled manner. Any one of these events has the potential to cause severe damage to the aircraft and may additionally result in passenger injuries or fatalities.

Factors which contribute to unstable approaches include: wind conditions that alter the speed and path of the aircraft, excessive speed and/or variations in the speed flown during the approach; failure to maintain a glide path that intersects the runway at the touchdown point; failure to track the center line of the runway; and equipment malfunctions. Pilots are trained to monitor these conditions during the approach and to initiate a go-around maneuver if the approach is unstabilized and a safe landing is not assured. The effectiveness of pilot training as a preventive measure ultimately depends, however, on the skill and judgment of the pilot in recognizing the unstabilized approach condition and executing the appropriate response as taught. Pilots with varying levels of skill are likely to respond differently to the same scenario.

In addition, unstabilized approaches are not the sole cause of runway overruns. A contaminated runway surface can reduce the braking effectiveness of the aircraft and increase the aircraft stopping distance. Thus, even with a stabilized approach, the aircraft may still be in danger of overrunning the runway end in some circumstances. The most common runway contaminates are rainwater and snow.

Automatic landing systems that guide the aircraft to touchdown do not completely solve the problems identified above. The control laws that govern operation of such systems may not always be able to reject disturbances such as those due to wind gusts, or certain equipment malfunctions. In such circumstances, the aircraft may still wind up on a destabilized approach and/or the automatic landing system must be disengaged. The pilot must still monitor and anticipate the need for a go-around even when such systems are in use. Landing systems also work best when precision approach guidance is available to the intended runway. Precision approaches provide both horizontal and vertical guidance on approach. Not all runways have precision approaches.

Therefore, there exists a need for providing pilots with information regarding an unstable approach to landing.

BRIEF SUMMARY OF THE INVENTION

The present invention provides systems, methods and computer program products for alerting a flight crew during landing that the tailwind exceeds acceptable limits. The system determines a base tailwind threshold speed for a candidate runway based on a performance constant associated with an aircraft and candidate runway information and determines present tailwind speed. If the tailwind speed is greater than the base tailwind threshold speed, a tailwind alert is generated.

In another aspect of the present invention, the system determines if the aircraft is in a tailwind alerting mode based on configuration of the aircraft and if it is determined that the aircraft is in the tailwind alerting mode, activates tailwind alerting.

BRIEF DESCRIPTION OF THE SEVERAL VIEWS OF THE DRAWING

The preferred and alternative embodiments of the present invention are described in detail below with reference to the following drawings.

DETAILED DESCRIPTION OF THE INVENTION

Figure 1:
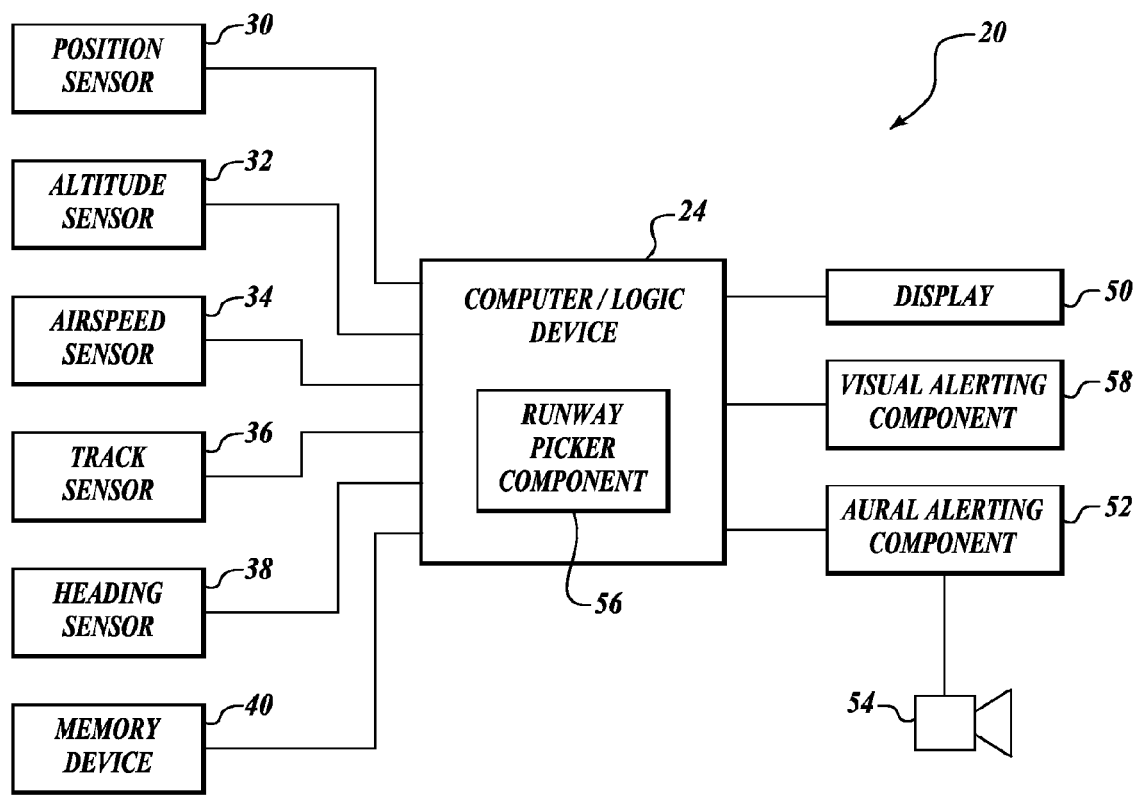
FIG. 1 is a block diagram of a system formed in accordance with an embodiment of the present invention.

FIG. 1 illustrates a block diagram of an example system 20 for implementing tailwind alerts in accordance with an embodiment of the present invention. The system 20 includes a computer or logic device 24 that receives a plurality of inputs from a number of sensors 30-38 and runway or terrain information from a runway/terrain database stored in a memory device 40. The computer or logic device 24 generates a tailwind alert based on the information received from the sensors 30-38 and data stored in the memory device 40 and outputs the generated alerts to one of a number of output devices, such as a display 50, a visual alerting component 58, an aural alerting component 52 with associated speakers 54.

The sensors include but are not limited to a position sensor 30, an altitude sensor 32, an air speed sensor 34, a track sensor 36, and a heading sensor 38. The computer or logic device 24 includes a runway picker component 56, such as that described in U.S. Pat. No. 6,304,800, which is hereby incorporated by reference, for selection of a desired runway. The runway picker component 56 receives information from one or more of the sensors 30-38 and runway or terrain information from the memory device 40 and interprets the received data in order to determine the candidate runway. Once the candidate runway has been selected, the computer or logic device 24 determines when to activate a tailwind alerting mode. Activation of tailwind alerting mode is based on any number of factors, such as gear or flaps in the landing position, power setting, angle of attack, a determined distance from the runway, altitude above the runway, or any other condition that would indicate that the aircraft is in a position where the determination of tailwind is important in determining whether a safe landing is in jeopardy. Activation may also occur after the candidate runway has been selected.

In one embodiment, the computer or logic device 24 is implemented in an Enhanced Ground Proximity Warning System (EGPWS), such as that described in U.S. Pat. No. 5,839,080, which is hereby incorporated by reference. Further, with regard to this embodiment, the EGPWS is implemented within an aircraft that does not include a flight management system (FMS). Typically, the functionality provided by the aural alerting component 52 is included within the EGPWS. In more complex aircraft, the computer or logic device 24 is implemented in either an EGPWS or FMS which are both located on the aircraft.

Once the computer or logic device 24 is in the tailwind alerting mode, the device 24 determines if the presently detected tailwind speed exceeds a tailwind threshold value. If this condition exists, the device 24 outputs an alert to any or all of the output devices 50, 52, or 58. If a tailwind alert is sent to the display 50, then the display 50 presents some sort of visual indication that the tailwind is above desired limits. The presentation on the display 50 may include the word "tailwind" or some other text or graphical indication that would indicate to the flight crew that an excessive tailwind condition is occurring. If the tailwind alert is sent to the visual alerting component 58, the visual alerting component 58 will output some sort of visual signal to the flight crew, thus indicating that an excessive tailwind condition is occurring. An example of a visual alerting component 58 includes a cockpit lamp or other similar device.

The aural alerting component 52 generates an audible signal according to the received tailwind alert sent by the device 24. The aural signal generated by the aural alerting component 52 is sent to one or more speakers 54, such as included in a cockpit audio system, for outputting a voice alert to the flight crew. Examples of voice alerts that can be pre-recorded or synthesized and outputted through the speakers 54 might include "tailwind" or other similar phrases that would identify that an excessive tailwind condition exists.

Figure 2:
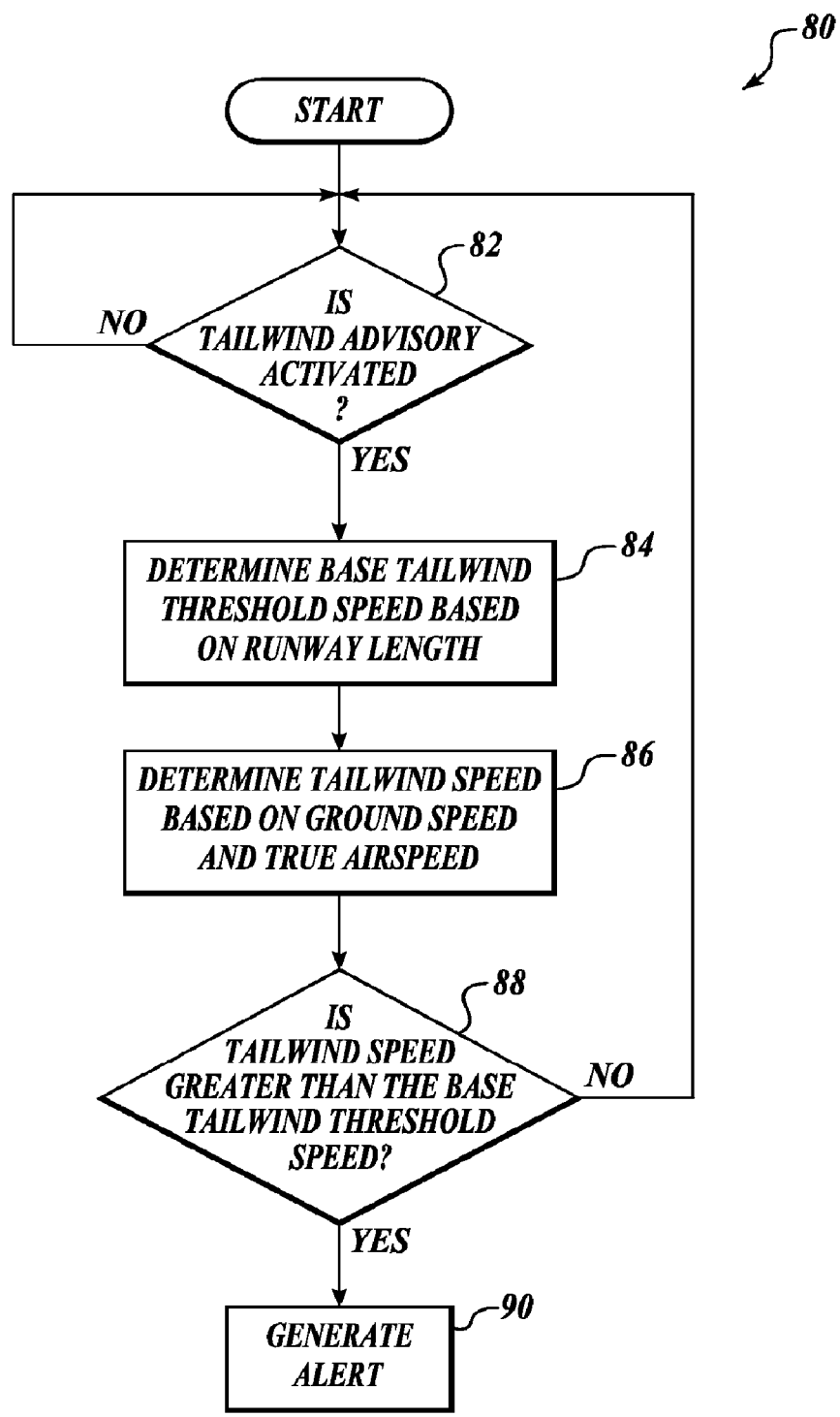
FIG. 2 is a flow diagram of an example process performed by the system of FIG. 1.

FIG. 2 illustrates a flow diagram of an example process 80 as performed by the system 20 shown in FIG. 1. First, at a decision block 82, the device 24 determines if tailwind alerting has been activated (tailwind alert mode). As described above, the device 24 determines if the tailwind alerting has been activated based on a number of factors, such as the result of the runway picker component 56 and other aircraft situational conditions, such as landing gear or flap positions, air speed, height above runway, etc. If it is determined at the decision block 82 that tailwind alerting is not activated, the process 80 repeats the determination of decision block 82. When tailwind alerting has been activated as determined by the decision block 82, at a block 84, the device 24 determines a base tailwind threshold speed based on any one of a number of factors, including runway length, a multiplier component that is based on test data, runway elevation as determined using indicated air speed and true air speed that are provided by the sensors, or an aircraft performance constant. The aircraft performance constant is based on any number of factors associated with this specific aircraft in which the system 20 is implemented in, such as landing speed, stall speed, minimum field landing length, or other performance constants that may affect aircraft landing.

At a block 86, the device 24 determines tailwind speed based on data from the sensors 30-38, for example, ground speed and true air speed. At a decision block 88, the device 24 determines if the determined tailwind speed is greater than the determined base tailwind threshold speed. If the tailwind speed is less than the base tailwind threshold speed, the process returns to the decision block 82. However, if the tailwind speed is determined to be greater than the base tailwind threshold speed, then at a block 90, an alert is generated by the device 24 and outputted to one or more of the output devices 50-58. The generated alert may be classified as any type of alert (Advisory, Caution, Warning).

Figure 3:
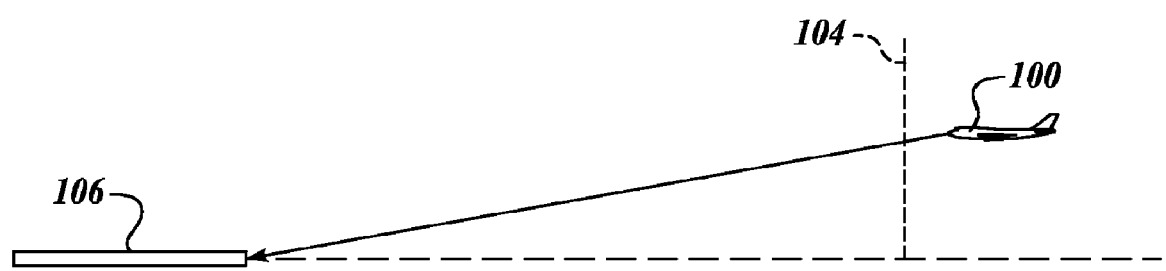
FIG. 3 is a side view of an aircraft on approach to landing.

FIG. 3 illustrates an aircraft 100 that is in a landing mode of a flight scenario. When the aircraft 100 reaches a tailwind alerting activation location 104, then the decision performed at the decision block 88 of FIG. 2 is performed. The position 104 may be a pre-defined distance from a runway 106 or may be an altitude value above the runway 106 or may be either one of those conditions in combination with certain aircraft conditions, such as those described above with regard to decision block 82. When the aircraft 100 is between the location 104 and the runway 106 (near end, far end, or anywhere in between), tailwind information is analyzed at a certain sampling rate. In one embodiment, the sampling rate is approximately every second, however, other sampling rates may be applied.

Tailwind alerting may be deactivated before touchdown on the runway 106, or after touchdown depending upon the desire of the aircraft operator in order to reduce unwanted alerts.

Figure 4:
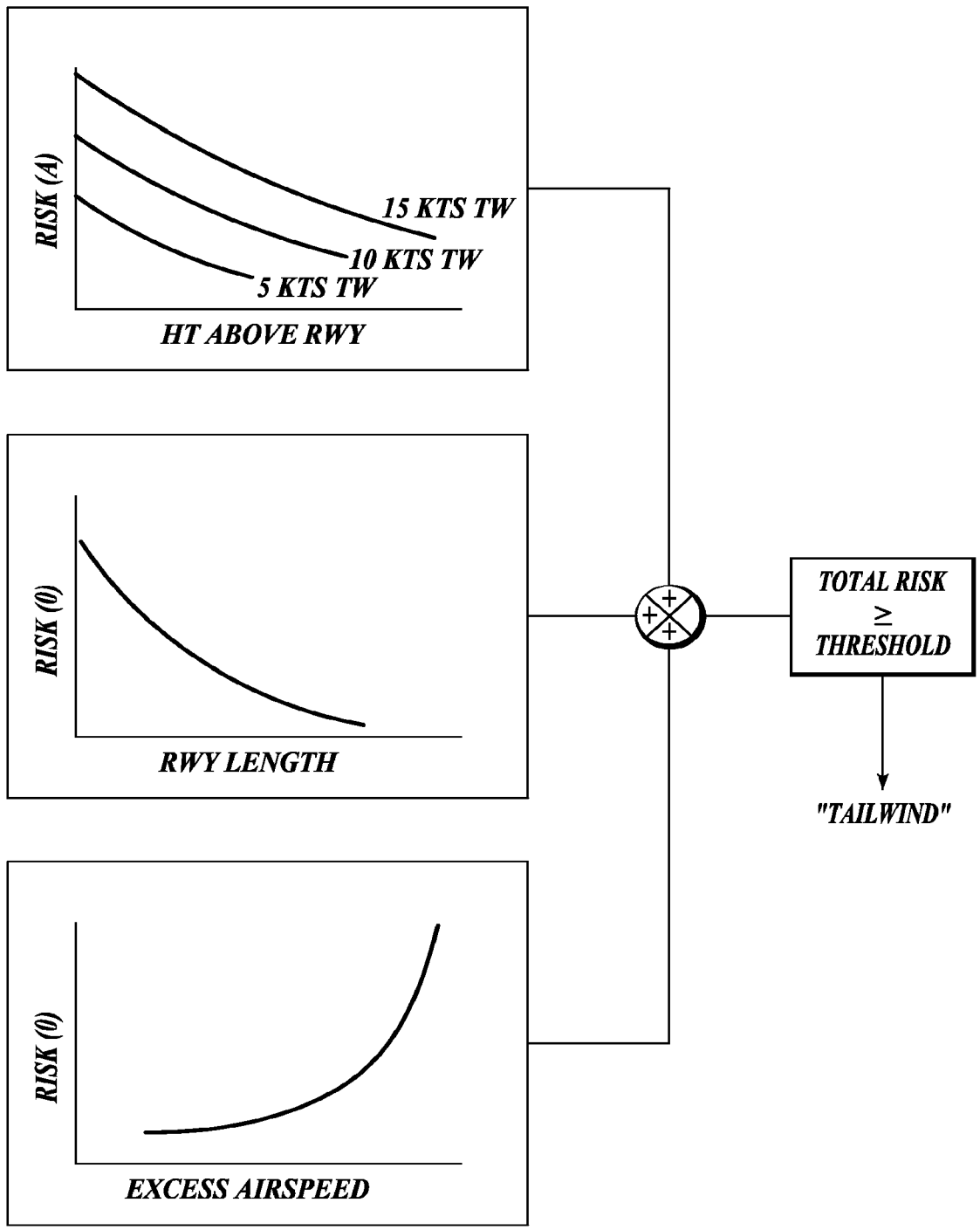
FIG. 4 is a logic diagram of an example of tailwind alert generation.

FIG. 4 illustrates a logic diagram of an example of the process performed at the decision block 88 (FIG. 2). In this example, three risk values (A), (B), (C) are aggregated and compared to a risk threshold value. If the aggregate value is greater than the risk threshold value, then a tailwind alert signal is generated.

The risk value (A) is based on aircraft height above the runway and current tailwind speed. The closer the aircraft is to the runway the higher the risk value becomes for the same airspeed. For example, if the height above runway is 200 ft and tailwind speed is 10 kts, then the risk value is 0.08. If the height above runway is 50 ft and tailwind speed is still 10 kts, then the risk value is 0.60.

The risk value (B) is based on runway length as determined from the runway information stored in the memory device 40. So, the shorter the runway, the greater the risk value (B) becomes.

The risk value (C) is based on excess airspeed. Excess airspeed is the amount of airspeed above a predefined reference velocity $V_{ref}$.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method comprising:
   a) determining a base tailwind threshold speed for a candidate runway based on a performance constant associated with an aircraft and candidate runway information;
   b) determining tailwind speed;
   c) determining if the tailwind speed is greater than the base tailwind threshold speed;
   d) determining if the aircraft is in a tailwind alerting mode based on configuration of the aircraft; and
   e) generating a tailwind alert if it is determined that the aircraft is in a tailwind alerting mode and it is determined that the tailwind speed is greater than the base tailwind threshold speed.

2. The method of claim 1, wherein the performance constant includes at least one of aircraft landing speed, stall speed, and minimum field landing length.

3. The method of claim 1, wherein determining if the aircraft is in the tailwind alerting mode is based on at least one of a landing configuration of the aircraft, or selection of a candidate runway.

4. The method of claim 1, wherein the generated tailwind alert includes an aural alert and outputting the aural alert through one or more speakers.

5. The method of claim 1, wherein the generated tailwind alert includes a visual alert and outputting the visual alert through a display device.

6. An apparatus for an aircraft, the apparatus comprising:
   memory configured to store a performance constant associated with an aircraft and candidate runway information;
   a computing device coupled to the memory, the computing device comprising:
      a first component configured to determine a base tailwind threshold speed for a candidate runway based on the stored performance constant and the candidate runway information;
      a second component configured to determine tailwind speed based upon signals generated by one or more aircraft sensors;
      a third component configured to determine if the tailwind speed is greater than the base tailwind threshold speed;
      a fourth component configured to determine if the aircraft is in a tailwind alerting mode based on configuration of the aircraft; and
      a fifth component configured to generate a tailwind alert if it is determined that the aircraft is in the tailwind alerting mode and it is determined that the tailwind speed is greater than the base tailwind threshold speed; and
   an output device coupled to the computing device, the output device configured to output the generated tailwind alert.

7. The apparatus of claim 6, wherein the performance constant includes at least one of aircraft landing speed, stall speed, and minimum field landing length.

8. The apparatus of claim 6, wherein the fifth component determines if the aircraft is in the tailwind alerting mode based on at least one of a landing configuration of the aircraft, or selection of a candidate runway.

9. The apparatus of claim 6, wherein the output device includes one or more speakers.

10. The apparatus of claim 6, wherein the output device includes a display device.

11. A computer program product residing on a computer readable medium, the product comprising:
   a first component configured to determine a base tailwind threshold speed for a candidate runway based on a performance constant for an aircraft and candidate runway information;
   a second component configured to determine tailwind speed based upon signals generated by one or more sensors;
   a third component configured to determine if the tailwind speed is greater than the base tailwind threshold speed;
      a fourth component configured to determine if the aircraft is in a tailwind alerting mode based on configuration of the aircraft; and
      a fifth component configured to generate a tailwind alert if it is determined that the aircraft is in the tailwind alerting mode and it is determined that the tailwind speed is greater than the base tailwind threshold speed.

12. The product of claim 11, wherein the performance constant includes at least one of aircraft landing speed, stall speed, and minimum field landing length.

13. The product of claim 11, wherein the fifth component determines if the aircraft is in the tailwind alerting mode based on at least one of a landing configuration of the aircraft, or selection of a candidate runway.

14. The product of claim 11, wherein the output device includes one or more speakers.

15. The product of claim 11, wherein the output device includes a display device.

* * * * *